June 25, 1963 A. TAGLIAFERRI 3,095,464
FOREHEARTH OR HOLDING FURNACE FOR HEATING MOLTEN
METALS, EQUIPPED WITH STIRRER
AND INDUCTION HEATER
Filed Aug. 3, 1960 2 Sheets-Sheet 1

INVENTOR.
ALDO TAGLIAFERRI
BY

June 25, 1963

A. TAGLIAFERRI 3,095,464

FOREHEARTH OR HOLDING FURNACE FOR HEATING MOLTEN
METALS, EQUIPPED WITH STIRRER
AND INDUCTION HEATER

Filed Aug. 3, 1960

INVENTOR.

ALDO TAGLIAFERRI

BY McGlew and Toren

United States Patent Office 3,095,464
Patented June 25, 1963

3,095,464
FOREHEARTH OR HOLDING FURNACE FOR HEATING MOLTEN METALS, EQUIPPED WITH STIRRER AND INDUCTION HEATER
Aldo Tagliaferri, 59 Viale Certosa, Milan, Italy
Filed Aug. 3, 1960, Ser. No. 47,232
Claims priority, application Italy Feb. 11, 1960
8 Claims. (Cl. 13—29)

This invention relates to a forehearth, for heating and overheating molten metals, and in particular for keeping the molten metal, tapped from a melting furnace, for example a cupola furnace, arc furnace or the like, at the required temperature.

Many drawbacks are encountered in the operation of the already known reheating furnaces, and forehearths associated with melting furnaces of any type, due to heat sources, to charging procedure and to location of molten metal filling hole, as the molten metal, is usually poured through the cover of holding furnace.

The above drawbacks result in undue erosions of furnace refractory lining, metal losses, surface oxidation and erratic heating.

Moreover the castings may show, on turn, flaws caused by the slags, which can easily be dropped into the molten bath, and by the oxidations due to draughts induced between the filling and tap holes of holding furnace.

It is moreover to be noted that the forehearths are to be equipped with means allowing to keep changed the temperature of molten metal, or to increase further such temperature, above all when additions are to be made to metal.

Said operations cannot always be made in the due and proper manner, whereby further drawbacks arise in the practical operation, for example the vaporisation or volatilisation of materials added to molten bath.

The object of the present invention is to provide a forehearth to remove the above and other drawbacks, keeping the molten metal bath at a pre-established temperature and stirring moreover this bath continuously.

Moreover, by this invention, all slags are automatically removed from the bath while the molten metal is being tapped, thereby preventing any possible reaction between the molten metal and the refractory material. At the same time, the molten metal can be kept, over a long time, at a suitable temperature with less heat consumption.

The forehearth according to the invention is characterized in that it comprises induction heating means, having at least one magnetic core, provided with at least two windings, one of which is connected with the electric main, while the other consists of at least one coil turn filled with molten metal, in which the secondary currents for heating same metal are induced.

According to the invention, at least one of the filling and/or tapping hole of forehearth communicates through suitable trap-shaped ducts with the inside of furnace and underneath the free surface of the molten metal.

The duct associated with the filling hole opens advantageously near the bottom of the chamber of furnace, while its top end is connected with a filling vat or hopper, through which the slags contained in the molten metal coming from the melting furnace are separated and collected.

The design and operational features of an advantageous embodiment form of a forehearth according to the present invention, will now be disclosed in the following description, taken with reference to the accompanying drawings, wherein a few embodiment forms of a forehearth equipped with low frequency induction heating means, are shown only as not restrictive examples. In same drawings.

The forehearth, as shown, comprises in the already known manner, a crucible A, to accommodate the molten metal. The hearth of said crucible is formed with two apertures 10—12, which communicate, through the associated sub-horizontal ducts 14, with suitably dimensioned, annular chambers 16—18, to the purposes which will be hereinafter stated, these chambers being located beneath the hearth of said crucible A. Such chambers 16—18 are formed within a protrusion 20, which extends from the lower side of forehearth structure, and that shows also suitably disposed apertures for the passage of columns corresponding to magnetic cores 22 and 24, such cores being designed to support the windings 26—28, that are connected with the industrial frequency main.

Each one of said windings 26 and 28 constitutes the primary coil of a transformer, the secondary winding of which is formed by the molten metal contained in the respective annular chambers 16—18, which so forms a short-circuited turn.

Figure 1:
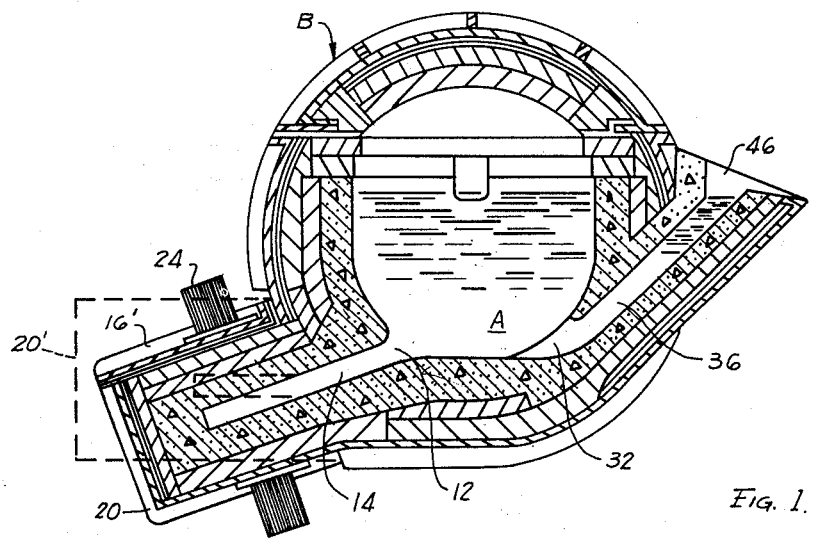
FIG. 1 is a cross-sectional view of furnace according to the invention, taken across the line I—I of FIG. 2.
Figure 2:
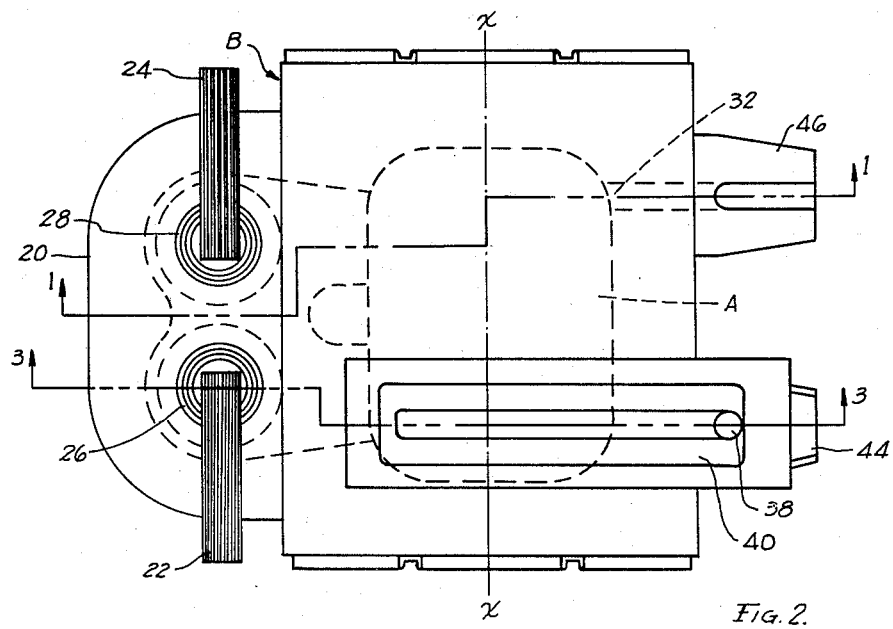
FIG. 2 is a plan view of FIG. 1.

As shown in the drawings, the axis of magnetic cores 22—24 are perpendicular to common plane whereon both annular chambers 16—18 lie, this plane being in turn conveniently inclined with respect to the horizontal, as shown in the figures, or it may be horizontal, or substantially horizontal, as shown by dotted lines in FIGS. 1 and 2.

Owing to the arrangement disclosed above, the molten metal contained in the crucible A is kept hot, and its temperature can even be increased. The metal contained in both annular chambers 16—18 (which is heated by the currents induced therein, and that forms, as hereinbefore said, short-circuited turns) is continuously and evenly circulated within the chamber A, the whole mass of molten metal being so continuously stirred.

Two apertures 30—32 are formed on hearth of crucible A on the side opposite to that whereon the apertures 10—12 are formed, the trap shaped channels 34—36, associated with the former apertures, are directed in a substantially subvertical direction, the channel 34 is connected by a branch 38, with the upper portion of the forehearth, and opens into a collecting vat or hopper 40.

Figure 3:
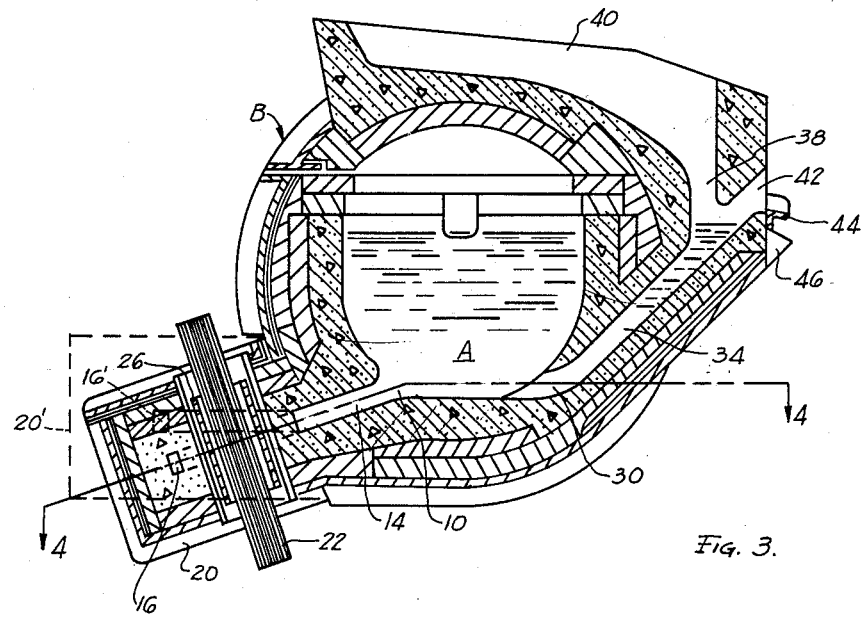
FIG. 3 is a cross-sectional view taken across the line III—III of FIG. 2.
Figure 4:
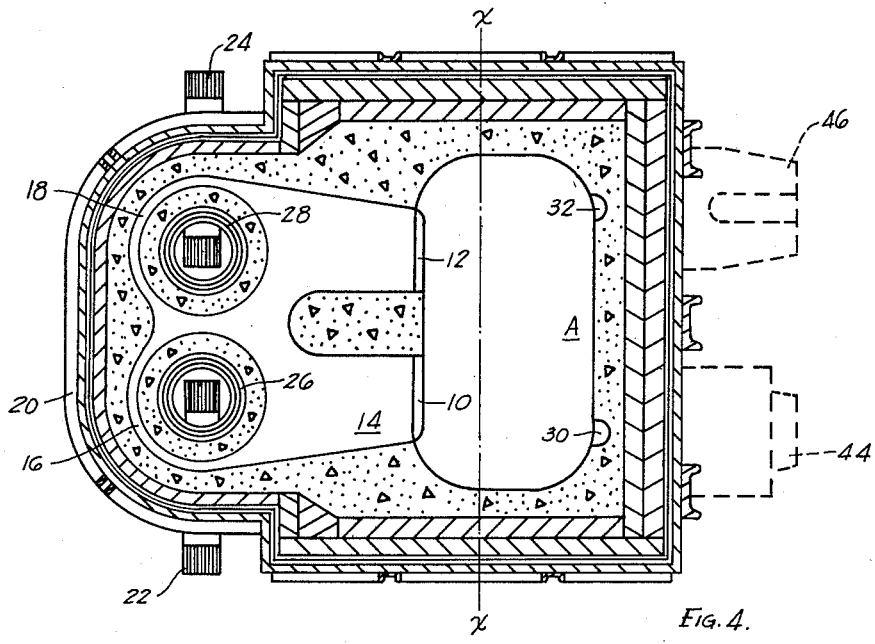
FIG. 4 is a cross-sectional view taken across the line IV—IV of FIG. 3.

Such a vat, as shown in FIG. 3, is formed on the cover B of the forehearth, and extends in a transversal direction with respect to same cover, for example crosswise to axis X—X, around which the forehearth can be tilted.

The bottom of vat 40 is suitably inclined towards the aperture of connecting branch 38. The top portion of said connecting branch 38 is formed with an inspection aperture 42 and 44. Such opening, which communicates with the trap shaped duct 34, can be closed by a stopper, and is fitted with a tubular outlet 44, through which the slags floating on the molten metal surface are discharged, while the molten metal is poured into a crucible A through the vat 20.

The aperture 32 communicates similarly with a tap duct 36, connected with a delivery nozzle 46.

The metal tapped from melting furnace or cupola furnace, flows into the vat 40, wherefrom it is gradually discharged through the branch 38 into the trap-shaped duct 34, thus filling the crucible A. As hereinbefore said, the molten metal contained in said crucible is continuously stirred by the thermal action of electric currents induced by the transformers 22 and 24.

The molten metal contained in the forehearth can be tapped in the already known manner through the delivery nozzle 46, by tilting the holding furnace around the axis X—X.

While the furnace is being tilted, the slags collected in the upper section of trap shaped duct 34, are automatically and gradually discharged through the tubular outlet 44. It will be understood that the two outlets 44 and 46 are placed for obvious reasons at different heights, for example the outlet 44 is higher than the outlet 46, to prevent the molten metal from flowing out therefrom.

As it can be readily understood, the forehearth hereinbefore disclosed and illustrated allows to attain all previously considered purposes; furthermore it allows to properly adjust the temperature of melting as well as the addition to molten bath of any required material or alloy.

It is possible too, to reach the possibly required overheating of molten metal, even over a long time, without danger of fouling the metal. Finally, changes and modifications might be made in the forehearth hereinbefore described and illustrated; thus, for example, the tubular outlet 44, through which the slags are removed might be fitted in an adjustable position, as it may be wished. Changes might be made also in the shape and location of trap shaped ducts. This rules also for the magnetic cores 22 and 24, the number and mutual arrangements of which might be varied, without departing from the scope of the present invention.

What I claim is:

1. An induction holding furnace comprising a furnace body supported for tilting about a transversely extending axis and formed with a relatively deep molten metal holding chamber arranged to hold molten metal up to a predetermined level; means forming an induction heating loop, for circulation and heating of molten metal, in said body and communicating with said chamber substantially below said predetermined level; a first passage in said body sloping upwardly from said chamber and having an inlet end communicating with said chamber substantially below said predetermined level and an outlet end above said predetermined level; a second passage in said body sloping upwardly from said chamber and having an outlet end communicating with said chamber substantially below said predetermined level and a slag discharge outlet above said predetermined level and at a level higher than the outlet end of said first passage; a molten metal receiving vat on said body above said chamber; and a third passage in said body connecting said vat to the upper end of said second passage for delivery of molten metal into said chamber and discharge of slag through said slag discharge outlet.

2. An induction holding furnace as claimed in claim 1, in which said induction heating loop means is in a substantially horizontal plane when said furnace is level.

3. An induction holding furnace as claimed in claim 1, wherein said loop means comprises a pair of loop passages in substantially coplanar relation and each communicating with said chamber.

4. An induction holding furnace as claimed in claim 1, wherein said loop means is inclined downwardly and outwardly from the bottom of said chamber when said furnace is level.

5. An induction holding furnace as claimed in claim 1, in which said first and second passages extend to the same side of said axis.

6. An induction holding furnace as claimed in claim 1, including a cover for said chamber; said vat being formed, at least partly, in said cover and being relatively elongated in a direction perpendicular to said axis.

7. An induction holding furnace as claimed in claim 5, in which said first and second passages are substantially parallel with each other; said first passage having a molten metal discharge nozzle disposed beneath the slag discharge outlet.

8. An induction holding furnace as claimed in claim 5, in which said loop means extends from said chamber to the side of the axis opposite to that side from which said first and second passages extend.

References Cited in the file of this patent

UNITED STATES PATENTS

| | | |
|---|---|---|
| 1,595,970 | Weed | Aug. 10, 1926 |
| 2,519,941 | Tama | Aug. 22, 1950 |
| 2,805,271 | Lang | Sept. 3, 1957 |